United States Patent Office 3,134,710
Patented May 26, 1964

3,134,710
HEXACHLOROISOPROPANOL FUNGICIDE
Everett E. Gilbert, Morris Township, Morris County, N.J., assignor to Allied Chemical Corporation, New York, N.Y., a corporation of New York
No Drawing. Filed Sept. 14, 1961, Ser. No. 137,963
9 Claims. (Cl. 167—22)

This invention relates to a new fungicide of exceptionally high activity and to a method for preventing and retarding fungus growth on organic material in which such fungicide is employed.

The new fungicide of the present invention is 1,1,1,3,3,3-hexachloro-2-propanol, hereafter referred to as hexachloroisopropanol. Hexachloroisopropanol is a known compound which may be prepared by reduction of hexachloroacetone with $LiAlH_4$ (Helvetica Chimica Acta, vol. 34, page 1343 (1951)). It has been found that fungi can be effectively combatted or controlled by applying hexachloroisopropanol to the locus to be protected from the fungi. Living plants may be protected by the hexachloroisopropanol without any injury thereto.

Hexachloroisopropanol may be applied as fungicide directly to the material to be treated but is advantageously incorporated as active ingredient in a suitable liquid or solid carrier to provide fungicidal spray and dust compositions. Further, the hexachloroisopropanol may be compounded to produce fungicidal concentrates adapted subsequently to be used in the preparation of spray or dust formulations.

Liquid fungicidal sprays may be prepared by first forming a solution of hexachloroisopropanol in a suitable organic solvent, e.g. isopropanol, acetone, xylene, high aromatic solvents, etc., and preferably adding a small amount (e.g. about 2 to 10% by weight of the solution) of a suitable wetting or emulsifying agent, such as diglycol oleate, p-isooctyl phenyl ether of polyethylene glycol or blends of alkyl aryl sulfonates with polyoxyethylene sorbitan esters of mixed fatty and resin acids. The resulting concentrate solution typically contains about 5 to 75%, and preferably about 10 to 50%, by weight of hexachloroisopropanol. Thereafter, the concentrate solution is diluted or admixed with water in amount to form an aqueous dispersion or emulsion suitable for spray application containing about 0.01 to 0.5% by weight of hexachloroisopropanol.

When employed in the form of a dust, the hexachloroisopropanol is mixed with a solid carrier, preferably in finely divided form, such as bentonite, fuller's earth, sulfur, lime, talc, diatomaceous earth, etc. The dust may also contain a small amount (e.g. about 2 to 10% by weight of the dust) of a suitable wetting agent, such as an alkyl aryl sulfonate, typified by the alkali metal (e.g. sodium) salts of decyl, dodecyl, tetradecyl and octadecyl benzene sulfonic acids, sodium lauryl sulfate, etc. A dust of this type usually contains about 2 to 20%, and preferably about 5 to 10%, by weight of hexachloroisopropanol.

Water-dispersible powders can be prepared by mixing hexachloroisopropanol with a suitable solid carrier together with a small amount of suitable wetting and dispersing agents (e.g. about 2 to 10% by weight of the powder) and grinding the mixture to a particle size of about 1 to 30 microns. Typical wetting agents include polyether sufonates, alkyl aryl sulfonates, etc. Typical dispersing agents include ligninsulfonates, naphthalene sulfonic acid-formaldehyde condensates, etc. Thereafter, the water-dispersible powder is admixed with water to form an aqueous dispersion suitable for spraying containing about 0.01 to 0.5% of hexachloroisopropanol.

The dosage of hexachloroisopropanol employed may vary widely, depending on the particular organisms to be controlled, field conditions, etc. In any event, a sufficient quantity is utilized to provide the desired toxicity.

The hexachloroisopropanol may be employed as the sole active ingredient in combatting fungi but, if desired, may also be combined with other known fungicides including Captan (N-(trichloromethylthio)-4-cyclohexene-1,2-dicarboximide), Maneb (manganous ethylenebis-dithiocarbamate), Thiram (bis(dimethylthiocarbamyl) disulfide), Kepone (decochlorooctahydro-1,3,4-metheno-2H-cyclobuta(cd)pentalen-2-one), mucochloric anhydride, etc. In some cases, the resulting combination has been found to exert a synergistic effect in combatting fungi.

The following example, in which parts are by weight, illustrates a method of preparing hexachloroisopropanol:

40.5 parts of powdered lithium aluminum hydride were placed in a reaction vessel equipped with a mechanical stirrer, thermometer, reflux condenser and dropping funnel. About 350 parts of ethyl ether were added to the vessel, and the mixture was refluxed for 3½ hours in a nitrogen atmosphere. Then 795 parts of distilled hexachloroacetone dissolved in about 350 parts of ethyl ether were added dropwise with stirring and cooling in the range of −20° to 0° C. with Dry Ice-acetone. This addition required 2 hours and was done in a nitrogen atmosphere. The reaction mixture was stirred for two hours below 0° C. and allowed to gradually warm to room temperature. It was then continuously added to 2 N $H_2SO_4$ (98 cc. concentrated $H_2SO_4$ made up to 1 liter). The resulting ether layer was successively washed with fresh acid, water, aqueous bicarbonate and water to neutrality, dried over sodium sulfate and then distilled to yield crude hexachloroisopropanol. It was recrystallized from about 461 parts of hexane using Dry Ice-acetone and was then washed with cold hexane. The purified hexachloroisopropanol constituted 607 parts (76% yield) and had a melting point of 86° to 90° C.

The importance of the present invention and the technical advance afforded thereby will be appreciated from the following fungicidal tests.

EXAMPLE 1

1% acetone solutions of hexachloroisopropanol, diluted with varying quantities of water, were tested in standard spore germination tests against spores of *Sclerotinia fructicola* (brown rot of stone fruits) and *Stemphylium sarcinaeforme* (target spot of clover).

*Sclerotinia fructicola* spores (produced by growing the fungus on potato dextrose agar plants for one week) were added to one series of dilutions, while *Stemphylium sarcinaeforme* spores (produced by growing the fungus on oatmeal agar plants for one week) were added to the other series. Following an incubation period of 24 hours at 65° F., each fungus-containing solution was examined under a microscope to determine average percent germination of spores. Complete control (no germination) of the *Sclerotinia fructicola* spores was obtained at a dosage of hexachloroisopropanol of 100 parts per million parts of solution. Complete control of the *Stemphylium sarcinaeforme* spores was obtained at a dosage of 1000 parts of hexachloroisopropanol per million parts of solution.

EXAMPLE 2

A 1% acetone solution of hexachloroisopropanol was diluted nine times its volume with "Elvanol" solution (a polyvinyl alcohol). The resulting solution was sprayed on apple plants to cover the foliage with fine droplets. The plants were then inoculated with *Venturia inaequalis* (apple scab). The amount of apple scab infection was recorded 14 days after the date of inoculation with the fungus during which time the plants were subjected to high humidity and temperature conditions conducive to germination of the fungus. The estimated percentage of the leaf area which was infected was recorded at this time and compared to plants which were subjected to substantially identical conditions except that the fungicide of this invention was not applied to them. The sprayed plants showed no evidence of injury. The following results were obtained:

*Infection With Apple Scab*

| | Percent leaf area affected |
|---|---|
| Hexachloroisopropanol | 0–8 |
| Untreated | 53–77 |

EXAMPLE 3

A 0.1% solution of hexachloroisopropanol in acetone was sprayed on tomato plants to cover the foliage with fine droplets. The plants were then inoculated with *Phytophthora infestans* (tomato late blight). The amount of plant defoliation was recorded 7 days after the date of inoculation of the fungus during which time the plants were subjected to high humidity and temperature conditions conducive to germination of the fungus. The estimated percentage of plant defoliation was recorded at this time and compared with data noted with respect to plants which were not treated with the fungicide of this invention and which were subjected to substantially identical conditions conducive to fungus germination. The sprayed plants showed no evidence of injury. The following results were obtained:

| | Percent average defoliation |
|---|---|
| Hexachloroisopropanol | 3.3 |
| Untreated | 93 |

Since various changes and modifications may be made in the invention without departing from the spirit thereof, the invention is deemed to be limited only by the scope of the appended claims.

I claim:

1. A method of preventing and retarding fungus growth on organic material which comprises treating said organic material with hexachloroisopropanol.

2. A method of preventing and retarding fungus growth on organic material which comprises treating said organic material with hexachloroisopropanol in a carrier.

3. A method of controlling fungi which comprises treating plants subject to attack by fungi with a composition comprising hexachloroisopropanol as active ingredient and a liquid carrier therefor.

4. A method of controlling fungi which comprises treating plants subject to attack by fungi with a composition comprising hexachloroisopropanol as active ingredient and a solid carrier therefor.

5. A method of controlling fungi which comprises treating plants subject to attack by fungi with a composition comprising hexachloroisopropanol as active ingredient dispersed in water.

6. A fungicidal solution comprising hexachloroisopropanol as active ingredient in an organic solvent and a wetting agent selected from the group consisting of diglycol oleate, p-isooctyl phenyl ether of polyethylene glycol and blends of alkyl aryl sulfonates with polyoxyethylene sorbitan esters of mixed fatty and resin acids, admixed with water to form a final effective concentration of about 0.01 to 0.5% by weight of hexachloroisopropanol.

7. A fungicidal dust comprising about 2 to 20% by weight of hexachloroisopropanol as active ingredient, a solid carrier and a wetting agent selected from the group consisting of alkyl aryl sulfonates and sodium lauryl sulfate.

8. A fungicidal water-dispersible powder comprising hexachloroisopropanol as active ingredient, a solid carrier and wetting and dispersing agents selected from the group consisting of polyether sulfonates, alkyl aryl sulfonates, ligninsulfonates and naphthalene sulfonic acid-formaldehyde condensates, admixed with water to form a final effective concentration of about 0.01 to 0.5% by weight of hexachloroisopropanol.

9. A fungicidal composition which comprises an effective concentration of hexachloroisopropanol as active ingredient dispersed in a mixture of a finely divided solid carrier and a wetting agent.

References Cited in the file of this patent

UNITED STATES PATENTS 2,461,906     Londergran _____ Feb. 15, 1949

OTHER REFERENCES

Horsfall: Fungicides and Their Action, vol. II, 1945, page 151.

Chemical Abstracts, vol. 46, page 4993$^h$ (1952) (abstract of Geiger et al., Helv. Chim. Acta. 34, 1335–44, 1951).